(12) United States Patent
Shoshan

(10) Patent No.: US 7,970,829 B2
(45) Date of Patent: Jun. 28, 2011

(54) MANAGING A RELATIONSHIP NETWORK

(75) Inventor: Itzhak Shoshan, Tel Aviv (IL)

(73) Assignee: SAP AG, Walldorf (DE)

( * ) Notice: Subject to any disclaimer, the term of this patent is extended or adjusted under 35 U.S.C. 154(b) by 874 days.

(21) Appl. No.: 11/869,582

(22) Filed: Oct. 9, 2007

(65) Prior Publication Data
US 2009/0094559 A1   Apr. 9, 2009

(51) Int. Cl.
*G06F 15/00* (2006.01)

(52) U.S. Cl. ........ 709/205; 709/227; 709/226; 709/229; 709/225; 715/853; 715/255; 715/234; 715/254

(58) Field of Classification Search .......... 709/220, 709/205, 227, 226, 229, 225
See application file for complete search history.

(56) References Cited

U.S. PATENT DOCUMENTS

| | | | |
|---|---|---|---|
| 6,278,991 B1 | 8/2001 | Ebert | |
| 6,343,265 B1 * | 1/2002 | Glebov et al. | 703/25 |
| 6,434,564 B2 | 8/2002 | Ebert | |
| 7,191,410 B1 | 3/2007 | Kruempelmann et al. | |
| 7,310,625 B2 | 12/2007 | Wu | |
| 2005/0091252 A1 | 4/2005 | Liebich et al. | |
| 2006/0106755 A1 | 5/2006 | Stuhec | |
| 2007/0136676 A1 | 6/2007 | Kruempelmann et al. | |
| 2007/0180036 A1 | 8/2007 | Hebert et al. | |

* cited by examiner

*Primary Examiner* — Jude J Jean Gilles
(74) *Attorney, Agent, or Firm* — Fish & Richardson P.C.

(57) ABSTRACT

This disclosure provides various embodiments of systems, methods, and software for the management of relationship networks. In one implementation, the software identifies an electronic communication, parses the electronic communication into a first communication attribute and a second communication attribute, and stores the first and second communication attributes in an attribute repository. Based on this persisted information, the software calculates one or more relationship indicators based on at least one of the first and second communication attributes and, perhaps in response to a request, communicates at least a subset of the relationship indicators to an interface for presentation as a graphical relationship network.

24 Claims, 7 Drawing Sheets

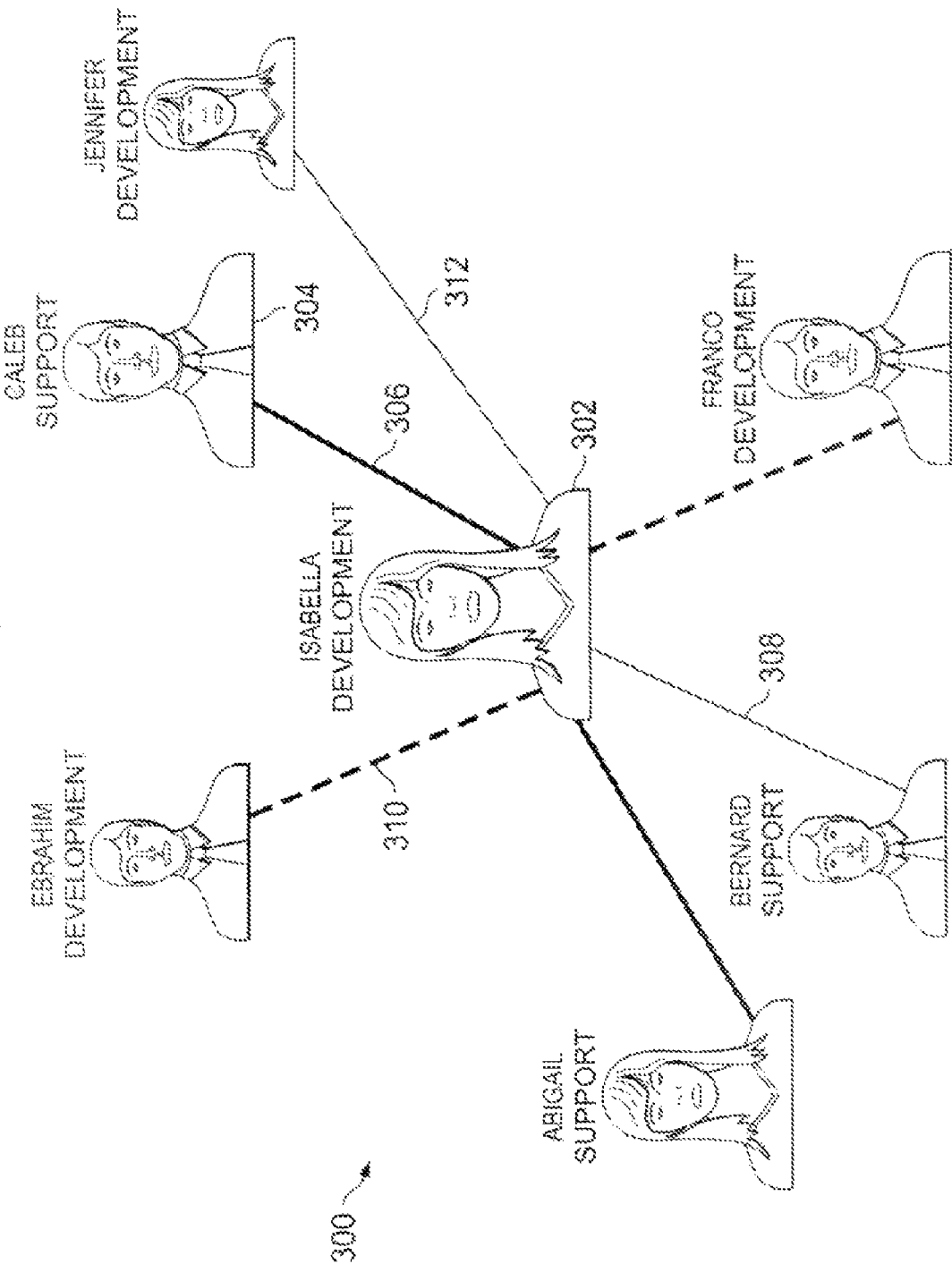

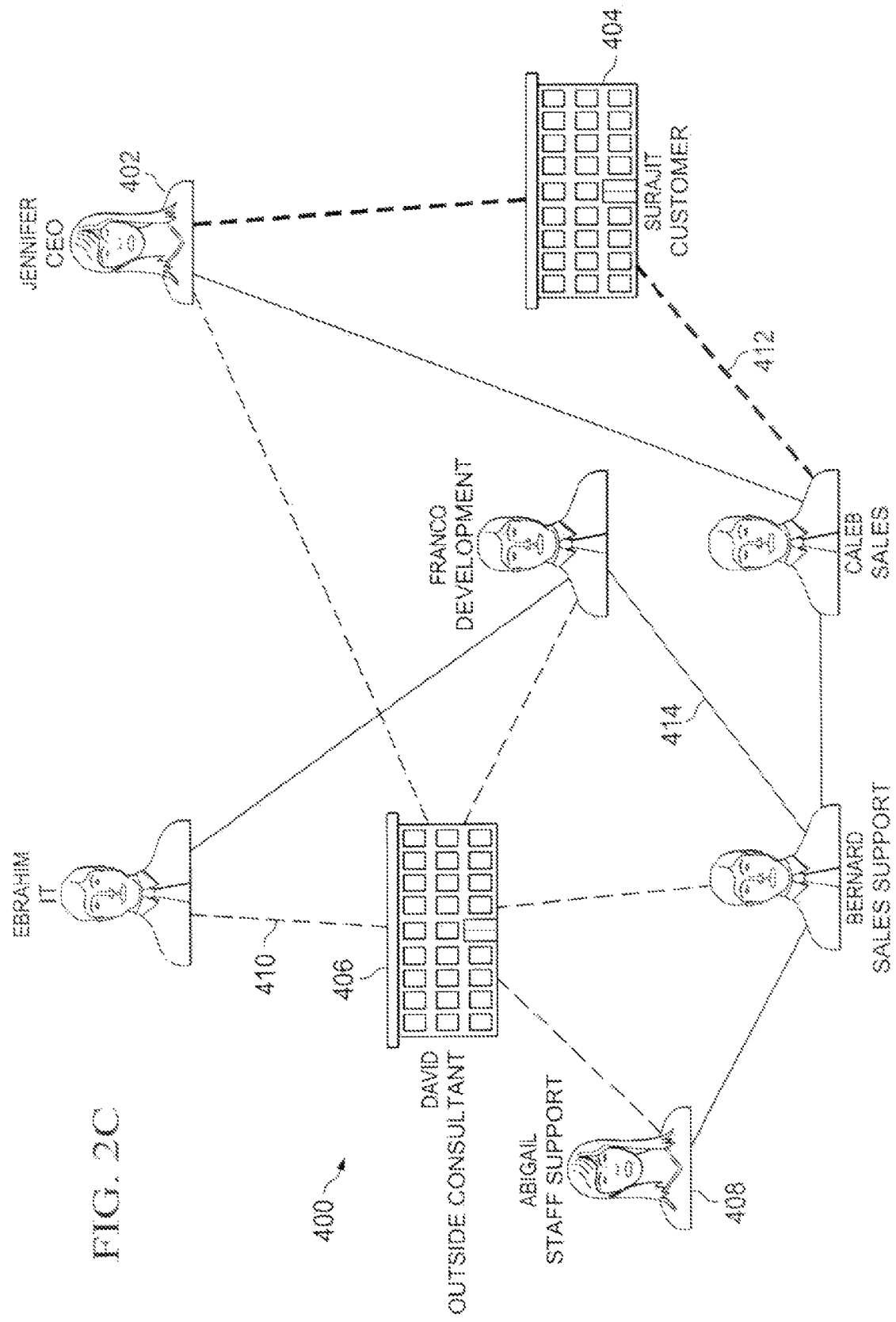

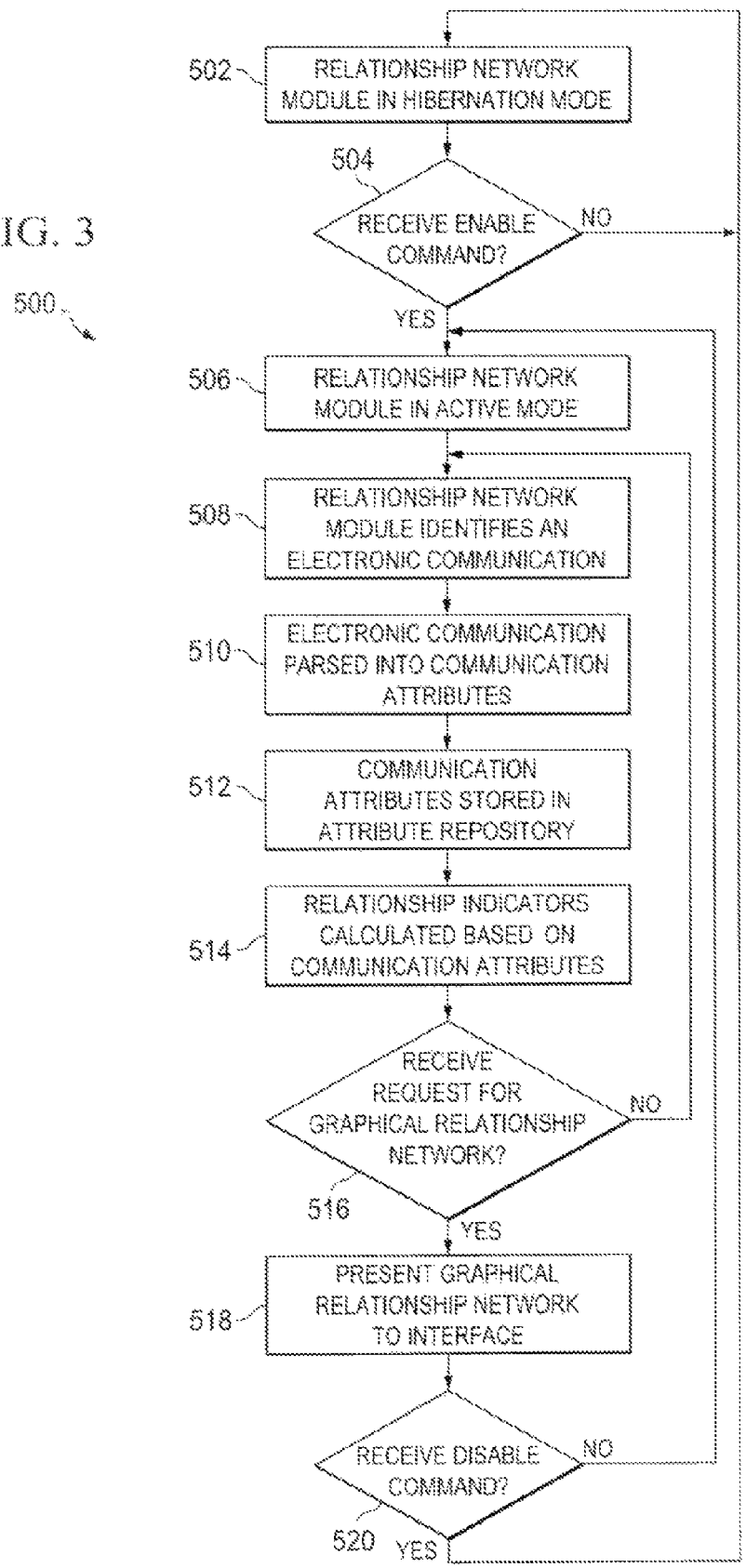

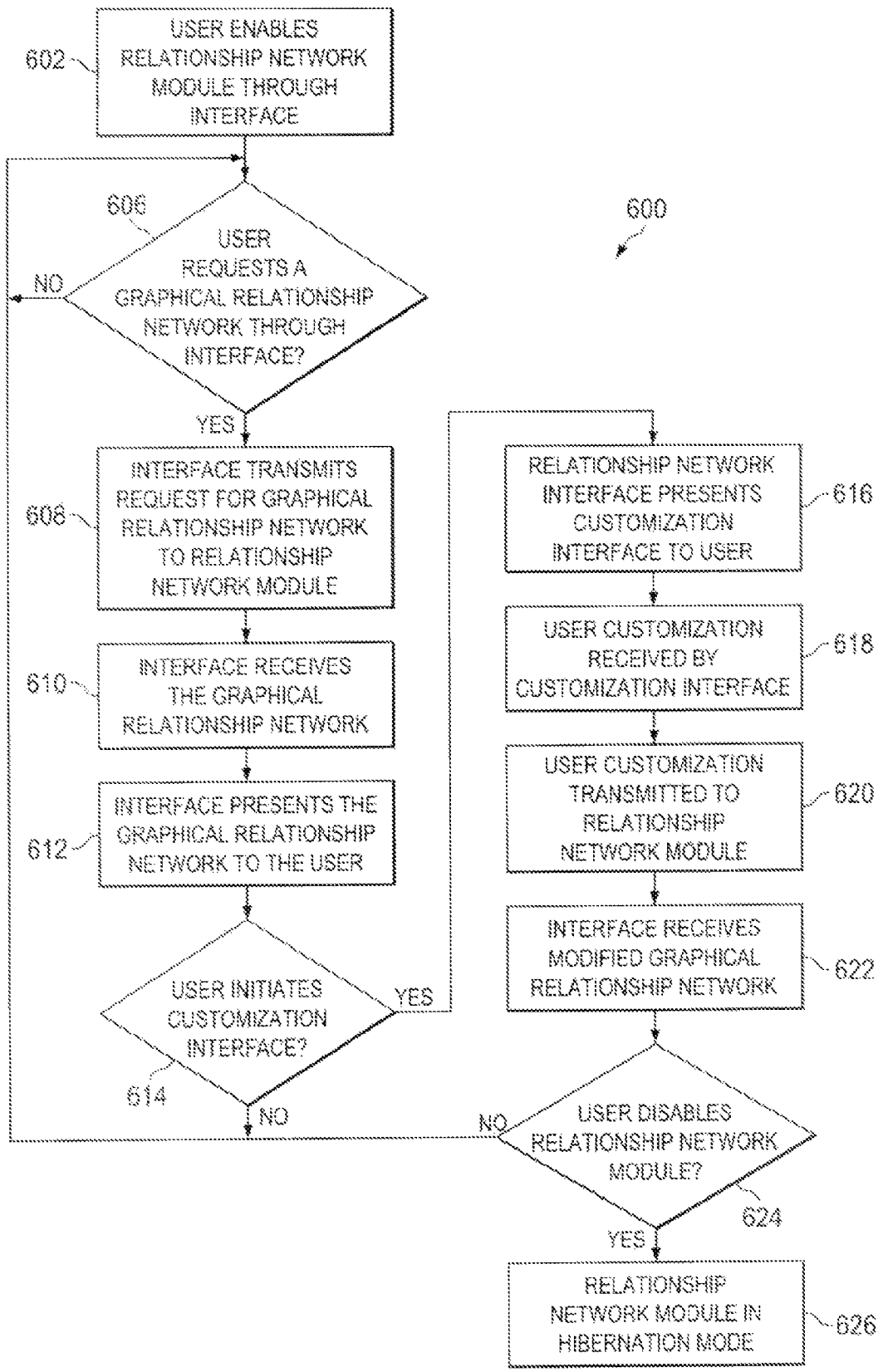

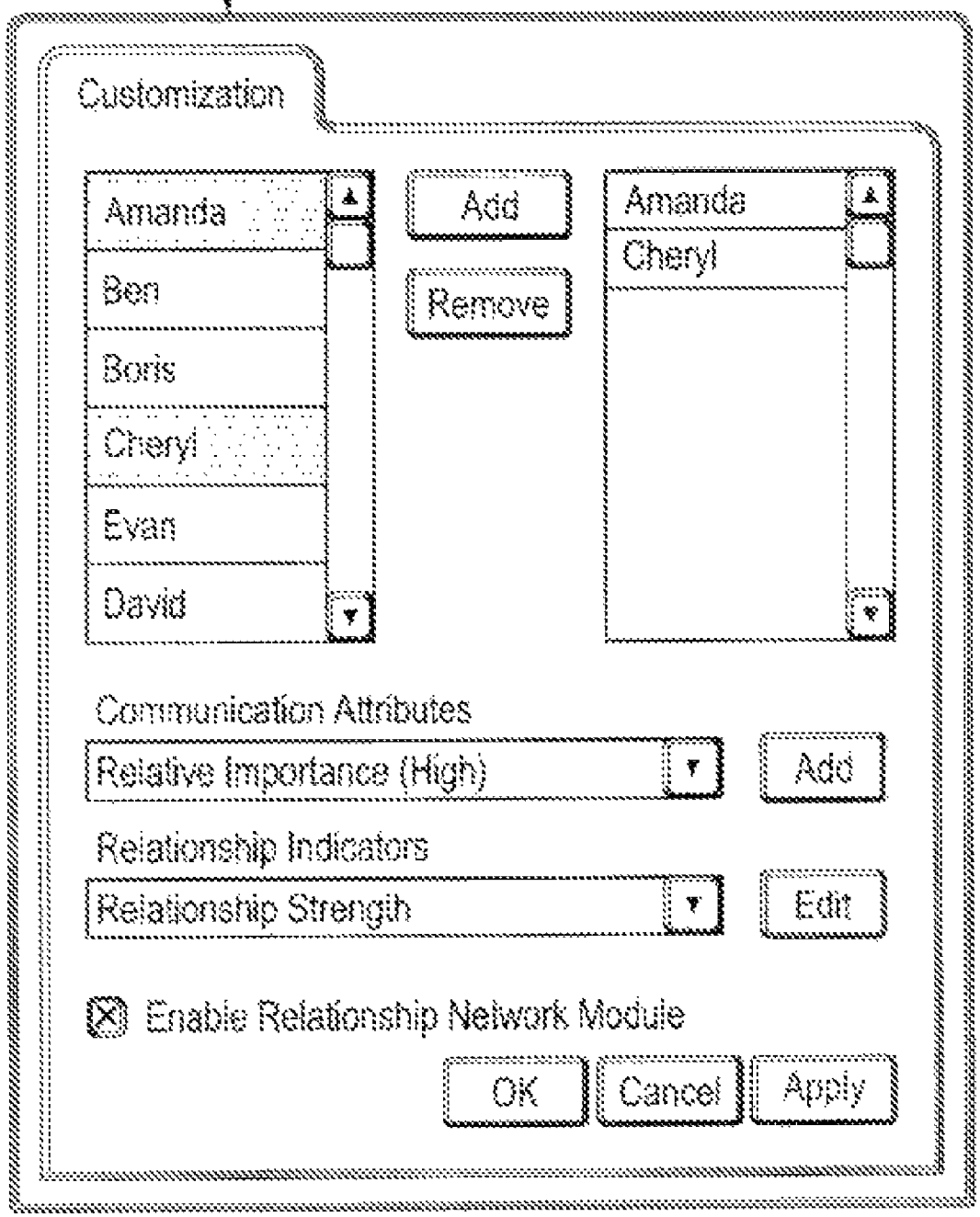

MANAGING A RELATIONSHIP NETWORK

TECHNICAL FIELD

This disclosure generally relates to detecting and monitoring electronic relationships and, more particularly, to systems, methods, and software for creating, implementing, utilizing, or otherwise managing a graphical relationship network.

BACKGROUND

Societal organizations, such as clubs, groups of friends, businesses, or other relationship networks are made of numerous individuals, each of whom may have relationships with one or more of the other members of the organization. These relationships may be formed through interaction on many different levels. Certain relationships may be based on business or commercial contact between the members of the organization, while other relationships may be based primarily on social contact between members. Further, these relationships may be formed, strengthened, or even weakened through repetitive contact between the members, or a lack thereof. Within such societal organizations, strong relationships may be leveraged for a variety of purposes. For example, a first person in an organization may rely on a particularly strong relationship with a second person to exploit that second person's relationships with other members without strong relationships with the first member. In other words, the ability to take advantage of another member's knowledge and contacts may be quite important to any particular societal member. Determining which member has the critical knowledge and contacts, however, is often a difficult undertaking for any particular member.

SUMMARY

This disclosure provides various embodiments of systems and software for the management of relationship networks. For example, one software implementation may be distributed among, for example, a relationship network module and interface and a graphical relationship network. In this example implementation, the relationship network module identifies an electronic communication, parses the electronic communication into a first communication attribute and a second communication attribute. The relationship network module can then store the first and second communication attributes in an attribute repository and calculate one or more relationship indicators based on at least one of the first and second communication attributes. The attribute repository may include communication attributes keyed by a user. At some later point or otherwise in response to a (perhaps concurrent) request, the relationship network module communicates at least a subset of the relationship indicators to an interface for presentation as a graphical relationship network.

In some implementations, the graphical relationship network includes at least one communication contact and the subset of relationship indicators, where each relationship indicator describes a first characteristic and a second characteristic. The first characteristic may indicate a relationship strength, and the second characteristic may indicate a relationship type. The relationship indicator may, in some aspects, include a substantially linear contour. In particular aspects, the first characteristic may indicate the relationship strength through a contour length, while the second characteristic may indicate the type of relationship through at least one of a contour color, a contour width, and a contour type. In some embodiments, the graphical relationship network may be a three-dimensional graphical relationship network.

In some cases, the electronic communication may be one of an email, a voicemail, a text message, or an instant message communication. The first communication attribute may include a communication contact and the second communication attribute may include a date of the electronic communication, a subject of the communication, and a content attribute of the communication. Further, the content attribute of the communication may include a security indication, an importance indication, a business attribute, and a contact relationship.

In certain implementations, the relationship network module calculates the relationship strength based, at least in part, on a frequency of the communication contact and a recency of the communication contact. The relationship network module may also be operable to receive a user customization, including a communication attribute selection, and modify the graphical relationship network based on the user customization. Further, the relationship network module may be able to receive a disable command and enter a hibernation mode based on the disable command.

In another example, a relationship network interface resides on a client. This relationship network interface acts as an agent that monitors electronic communications sent from a communication system for use by the relationship network module. In response to a manual or automatic request, the interface receives graphical relationship network from the relationship network module and presents the graphical relationship network to a user through a graphical user interface. In specific implementations, the relationship network interface may present a user customization interface to the user, receive a user customization from the user, and/or send the user customization to the relationship network module. The relationship network interface may receive the electronic communication from the communication system and transmit the electronic communication to the relationship network module. Further, the relationship network interface may be a plug-in for use by a communication system (such as an exchange server or voicemail system) or browser.

Each of the foregoing, as well as other disclosed example software are computer implementable. Moreover, some or all of these aspects may be further included in respective systems and methods for managing a relationship network. The details of these and other aspects and embodiments of the disclosure are set forth in the accompanying drawings and the description below. Features, objects, and advantages of the various embodiments will be apparent from the description and drawings, and from the claims.

DESCRIPTION OF DRAWINGS

FIGS. 2A-C illustrates one example of a graphical relationship network demonstrating relationship strengths and relationship types between multiple communication contacts, in accordance with one embodiment of the system of FIG. 1;

FIG. 3 is an example flowchart illustrating the management of communications and generation of a graphical relationship network by a relationship network module, in accordance with certain embodiments included in the present disclosure;

FIG. 4 is an example flowchart illustrating the management of communications and request for a graphical relationship network through a relationship network interface, in accordance with certain embodiments included in the present disclosure; and FIG. 5 depicts an example Graphical User Interface (GUI) utilized by a user to customize or otherwise manage a graphical relationship network, in accordance with certain embodiments included in the present disclosure.

DETAILED DESCRIPTION

Figure 1:
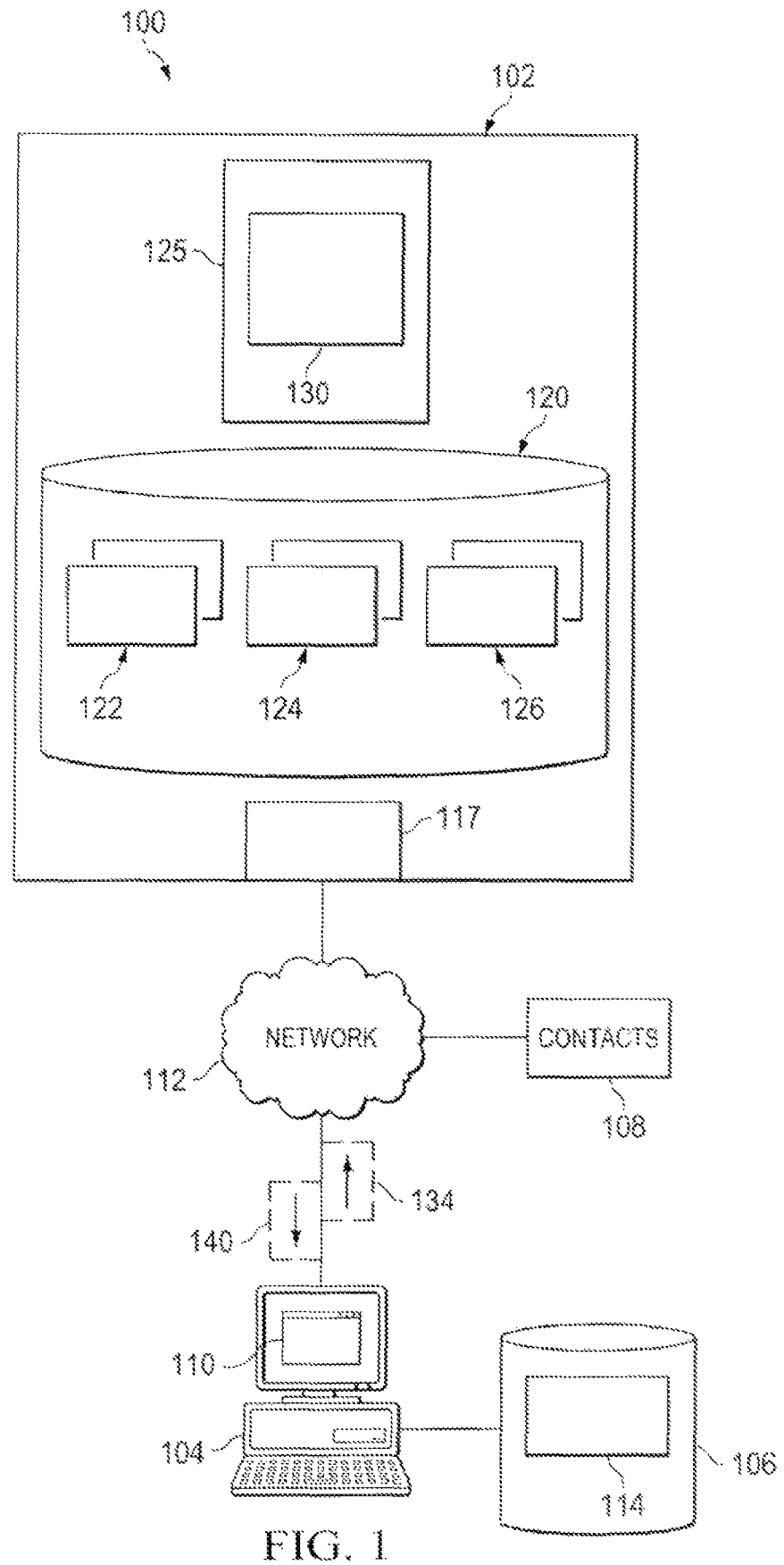
FIG. 1 illustrates an example system for the detection, monitoring, and management of communications by a relationship network module and interface in accordance with certain embodiments included in the present disclosure.

FIG. 1 illustrates an example system 100 for monitoring communications between various individuals, computers, departments, businesses, or other contacts by a relationship network module and interface for the generation of, for example, a graphical relationship network. At a high level, these communications include any suitable electronic communication (also includes a communication that may be electronically monitored) including (for example) emails, text messages, voicemails, logged phone calls or physical mail, electronic or physical payments, meetings, and so forth. These particular communications are identified from, to, or between various contacts and parsed or otherwise mined into certain data elements for analysis. The mined data may be analyzed to determine one or more relationship indicators, which may generally describe or exemplify, for example, the strength or type of the relationship between various contacts. For example, the analysis may involve two departments (or, more specifically, an attempt to determine the strength of the relationship between two departments) based on inter-department communications between members. In certain embodiments, the communications, mined data, and relationship indicators may be persisted or otherwise stored for subsequent use or, in some aspects, may be utilized simultaneously with the collection. The client may also request a generation of the graphical relationship network for viewing. In response to such a request, the graphical relationship network, including the contacts and at least a portion of the relationship indicators, may be presented to the client for viewing locally or remotely. Generally, the graphical relationship network graphically represents relationships between multiple contacts, including, for example, a strength of each relationship and a type of each relationship.

Generally, system 100 uses relationship network module 130 to identify communications from a client or user, such as client 104, in order to develop a graphical relationship network 140. The graphical relationship network 140, in general, may allow the client 104 to maintain relationships with colleagues, as well as facilitate a means for knowledge transfer among individuals. This relationship network module 130 may, for example, be a hosted software application, which may provide a framework that enables a business or enterprise, among others, to map its informal organizational structure. The relationship network module 130 may, in some instances, achieve greater networking among people within the organization or enterprise by identifying particular persons for the passing of knowledge and assisting in decision-making. Further, the relationship network module 130 may allow for easier identification of experts in a particular knowledge domain and sort the experts by, for example, proximity, expense, or expertise, within the informal organizational structure. In some aspects, the relationship network module 130 may identify knowledge "silos," i.e., knowledge maintained by a particular division within the enterprise or a community, which may remain withheld by the enterprise or the community. Also, in particular aspects, the relationship network module 130 may allow the enterprise to identify an organization alignment opportunity. More specifically, the enterprise may be able to identify gaps between the formal organization structure and informal organization structure, which may reflect an inadequacy between the formal structure and the needs of the enterprise.

Turning to the illustrated embodiment, system 100 includes or is communicably coupled with server 102, one or more clients 104, and one or more contacts 108, at least some of which communicate across network 112. Server 102 comprises an electronic computing device operable to receive, transmit, process, and store data associated with system 100. Each computer is generally intended to encompass any suitable processing device. For example, although FIG. 1 illustrates one server 102 that may be used with the disclosure, system 100 can be implemented using computers other than servers, as well as a server pool. Indeed, server 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 102 may be adapted to execute an operating system including Linux, UNIX, Windows Server, or any other suitable operating system. According to one embodiment, server 102 may also include or be communicably coupled with a web server and/or a mail server. In particular embodiments, server 102 may be communicably coupled to an instant message (IM) server, as well as, a server for storing, transmitting, or otherwise managing voicemail messages. Further, in certain embodiments, server 102 may be communicably coupled to a server that stores, transmits, or otherwise manages communications from a cellular phone, personal digital assistant (PDA), pager, or any other electronic device capable of sending, receiving, or otherwise transmitting electronic communications.

Illustrated server 102 includes local memory 120. Memory 120 may include any memory or database module and may take the form of volatile or non-volatile memory including, without limitation, magnetic media, optical media, random access memory (RAM), read-only memory (ROM), removable media, or any other suitable local or remote memory component. Illustrated memory 120 includes one or more stored electronic communications 122, one or more communication attributes 124, and one or more relationship indicators 126. But memory 120 may also include any other appropriate data such as an organization's structure, contacts, or other human resources data, VPN applications or services, firewall policies, a security or access log, print or other reporting files, HTML files or templates, data classes or object interfaces, child software applications or sub-systems, and others. In certain embodiments, stored electronic communications 122 may only be transiently stored in memory 120, residing there for only the length of time that relationship network module 130 identifies the electronic communications 122 as one such communication that data should be mined from, and subsequently, mining the data from the electronic communication 122 as communication attributes 124. Moreover, some or all stored communications 122, communication attributes 124, and relationship indicators 126 may be stored remote from server 102 in a separate data repository communicably coupled to server 102.

Particular stored electronic communications 122 may be mined into multiple communication attributes 124. Communication attributes 124 are discrete portions of the stored electronic communication 122 that can be used to help identify a relationship between the parties to the stored communication 122 (e.g., client 104 and one or more contacts 108) or determine the strength thereof. Thus, these communication attributes 124 may represent the communication sender, communication recipient(s) (including groups), subject of the stored communication 122, importance of the stored communication 122 (i.e., high, normal, or low), confidentiality, marked category, type of communication, security status of the stored communication 122 (i.e., encrypted or unencrypted), date of the stored communication 122, and so on. Moreover, the communication attribute 124 may represent or describe the relationship basis, such as, for example, a business relationship, social relationship, both business or social, or neither (e.g., an unknown relationship).

For example, a client electronic communication 122, such as an e-mail, from one person at a first enterprise to a second person at a second enterprise—although it may be to any number of contacts 108—may contain many communication attributes 124. One communication attribute 124 may be a known or determined relationship basis or bases between the first and second persons. For example, the basis of the relationship may be business, or if the first and second persons are also socially acquainted, there may be multiple bases for the relationship. Another communication attribute 124 within the e-mail may be a keyword within the subject line of the client communication 122. For example, the client 104 may customize the relationship network module 130 to extract particular keywords from the subject line corresponding to a certain business project, division, or enterprise. Yet another communication attribute 124 may be a date of the electronic communication 122, e.g., a date the client communication 122 was sent by client 104 to one or more contacts 108. By tracking the date of the client communication 122 as a communication attribute 124, relationship network module 130 may realize a recency of the client communication 122. By realizing the recency of the client communication 122 as a communication attribute 124, the relationship network module 130 may render a graphical relationship network 140 that describes or illustrates the most recent client communications 122. As yet another example of a communication attribute 124, the relationship network module 130 may mine data associated with the receipt name of the client communication 122, i.e., the name, username, or alias of a contact 108. By tracking the recipient of the client communication 122, the relationship network module 130 may generate a graphical relationship network 140 that describes or illustrates the most frequent communications between client 104 and contacts 108.

Memory 120 also stores one or more relationship indicators 126. Generally, relationship indicators 126 allow the system to graphically represent the strength and type of relationship between two or more users, such as, for example, client 104 and one or more contacts 108, or even multiple clients 104. Relationship indicators 126 are determined by relationship network module 130 based on the communication attributes 124 mined from stored communications 122. As described more fully below in FIGS. 2-4, the graphical form of the relationship indicator 126 may be a contour (e.g., a line or arrow) which illustrates the strength of the relationship through a length of the contour. For example, the strength of the relationship between client 104 and contact 108 may be based on the frequency of the client communications 122 sent from client 104 to contact 108 and may be represented by a relatively longer contour connecting client 104 to contact 108 in the graphical relationship network 130. In some implementations, increased relationship strength may be described or illustrated by a width of the contour, however, client 104 may choose any appropriate descriptive quality of the contour (e.g., color, dashed, dotted, 3-D). In some cases, the user could set authorization level for various relations. For example, some relations can be designated as public, some designated as visible only for specific individual or groups, and some designated as private and therefore are hidden and visible only for the user.

Illustrated server 102 also includes processor 125. Processor 125 executes instructions and manipulates data to perform the operations of server 102. Processor 125 is, for example, a central processing unit (CPU), a blade, an application specific integrated circuit (ASIC), or a field-programmable gate array (FPGA). Although FIG. 1 illustrates a single processor 125 in server 102, multiple processors 125 may be used according to particular needs and reference to processor 125 is meant to include multiple processors 125 where applicable. In the illustrated embodiment, processor 125 executes relationship network module 130.

At a high level, the relationship network module 130 is operable to identify client communications 122, parse the client communications 122 into communication attributes 124, develop relationship indicators 126 based on the communication attributes 124 and, in some aspects, customization provided by client 104, and present a graphical relationship network 140 to the client upon request. More specifically, relationship network module 130 is any application, program, module, process, or other software that mines data from communications 122 and develops indicators based on the data in order to graphically present such indicators to client 104. Further, in some cases, relationship network module 130 may be operable to enter a hibernation mode upon a disable command sent by the client 104 to the relationship network module 130. In hibernation or disabled mode, the relationship network module may cease mining data from the communications 122 in order to, for example, increase the client 104's privacy. In some cases, relationship network module 130 may be communicably coupled with an exchange server application (for emails, contacts, calendar, etc.), a human resources (HR) application and associated data, a voicemail system, an instant messaging system, an electronic phone call log or mail log, and so forth. For example, relationship network module 130 can integrate with formal HR systems (or other business application modules as appropriate). Such integration can be used to enhance the data automatically gathered about the user from his electronic communications with the formal data stored in the organizational systems like user role, authorizations, managers, employees, peers, and so forth. Put another way, this integrated information helps enable the system to provide a more holistic view of the user.

Regardless of the particular implementation, "software" may include software, firmware, wired or programmed hardware, or any combination thereof as appropriate. Indeed, relationship network module 130 may be written or described in any appropriate computer language including C, C++, Java, Visual Basic, assembler, Perl, any suitable version of 4GL, as well as others. For example, relationship network module 130 may be part of a composite application, portions of which may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while relationship network module 130 is illustrated in FIG. 1 as a single module, relationship network module 130 may include numerous other sub-modules or may instead be a single multi-tasked module that implements the various features and functionality through various objects, methods, or other processes. Further, while illustrated as internal to server 102, one or more processes associated with relationship network module 130 may be stored, referenced, or executed remotely. For example, relationship network module 130 may be distributed into a server-side component and a client-side agent. Moreover, relationship network module 130 may be a child or sub-module of another software module or enterprise application (not illustrated) without departing from the scope of this disclosure.

Server 102 may also include interface 117 for communicating with other computer systems, such as clients 104, over network 112 in a client-server or other distributed environment. In certain embodiments, server 102 sends and receives data between internal or external senders through interface 117 for storage in memory 120 and/or processing by processor 125. This data may include client communications 122, a request 134 from client 104 to relationship network module 130 to render a graphical relationship network, and the rendered graphical relationship network 140. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Network 112 facilitates wireless or wireline communication between computer server 102 and any other local or remote computer, such as clients 104 and contacts 108. Network 112 may be all or a portion of an enterprise or secured network. In another example, network 112 may be a VPN merely between server 102 and client 104 across wireline or wireless link. Such an example wireless link may be via 802.11a, 802.11b, 802.11g, 802.11n, 802.20, WiMax, and many others. While illustrated as a single or continuous network, network 112 may be logically divided into various sub-nets or virtual networks without departing from the scope of this disclosure, so long as at least portion of network 112 may facilitate communications between server 102 and at least one client 104. In other words, network 112 encompasses any internal or external network, networks, sub-network, or combination thereof operable to facilitate communications between various computing components in system 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 112 may be a secure network associated with the enterprise and certain remote clients 104.

Continuing with FIG. 1, client 104 is any computing device operable to connect or communicate with server 102 or network 112 using any communication link. At a high level, each client 104 includes or executes at least GUI 110 and comprises an electronic computing device operable to receive, transmit, process, and store any appropriate data associated with system 100. While illustrated separately, client 104 typically includes distributed storage 106 (shown with historical relationship information 116) or is coupled with some relatively remote or distributed memory that may be quickly accessed. It will be understood that there may be any number of clients 104 communicably coupled to server 102. Further, "client," "contact," and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers.

As used in this disclosure, client 104 is any computer used by a person, department, organization, small business, enterprise, or any other entity that may use or communicate with system 100, namely relationship network module 130. For simplicity, client 104 may encompass a personal computer, touch screen terminal, workstation, network computer, kiosk, wireless data port, smart phone, personal data assistant (PDA), one or more processors within these or other devices, or any other suitable processing device used by or for the benefit of client 104. For example, client 104 may be a PDA operable to wirelessly connect with an external or unsecured network. In another example, client 104 may comprise a laptop that includes an input device, such as a keypad, touch screen, mouse, or other device that can accept information, and an output device that conveys information associated with the operation of server 102 or clients 104, including digital data, visual information, or GUI 110. Both the input device and output device may include fixed or removable storage media such as a magnetic computer disk, CD-ROM, or other suitable media to both receive input from and provide output to users of clients 104 through the display, namely, the client portion of GUI or application interface 110.

Continuing with client 104, in particular embodiments, client 104 utilizes relationship network interface 114 for several tasks including, for example, generating and transmitting request 134 for relationship network module 130 to render and transmit graphical relationship network 140 to client 104 for viewing on GUI 110. Client 104 may also utilize relationship network interface 114 to customize relationship network module 130 in order to, for instance, mine particular communication attributes 124 from stored communications 122, present particular relationship indicators 126 in various colors and/or contour types, or enter a hibernation mode. More specifically, relationship network interface 114 is any application, program, module, process, or other software that allows client 104 to interact (e.g., communicate, customize, disable, enable) with relationship network module 140. In certain implementations, relationship network interface 114 may be an electronic mail client plug-in or a browser plug-in. As the plug-in, relationship network interface 114 may capture many or all communications from client 104 and transmit these client communications 122 to server 102 over network 112. In some embodiments, however, relationship network interface 114 may merely monitor client communications 122 sent from a communication client, e.g., an e-mail client, to server 102.

GUI 110 comprises a graphical user interface operable to allow the user of client 104 to interface with at least a portion of system 100 for any suitable purpose, such as viewing graphical relationship network 140, customizing the performance or options of the relationship software and interfaces, other applications, or other data. Generally, GUI 110 provides the particular user with an efficient and user-friendly presentation of data provided by or communicated within system 100. As shown in later figures, GUI 110 may comprise a plurality of customizable frames or views having interactive fields, pull-down lists, and buttons operated by the user, as well as graphical relationship networks 140 in a variety of formats. GUI 110 may offer the user various filters that allow him to review only certain contacts, communications, and types of each. For example, GUI 110 can be operable to allow client 104 to customize relationship network module 130 in a user-friendly form based on the displayed data. This may include viewing only business contacts, only certain departments, internal vs. external, confidential vs. open, email or logged physical mail, strong vs. weak relationships, and so forth. It can also allow each (or an authenticated) user to modify his relationship map by removing relations that he wishes to hide or add relations that were not tracked automatically by the system.

It should be understood that the term graphical user interface may be used in the singular or in the plural to describe one or more graphical user interfaces and each of the displays of a particular graphical user interface. Indeed, reference to GUI 110 may indicate a reference to the front-end or a component of relationship network module 130 (e.g., relationship network interface 114), as well as the particular interface accessible via client 104, as appropriate, without departing from the scope of this disclosure. Therefore, GUI 110 contemplates any graphical user interface, such as a generic web browser or touch screen that processes information in system 100 and efficiently presents the results to the user. Server 102 can accept data from client 104 via the web browser (e.g., Microsoft Internet Explorer or Mozilla Firefox) and return the appropriate HTML or XML responses to the browser using network 112.

Figure 2A:
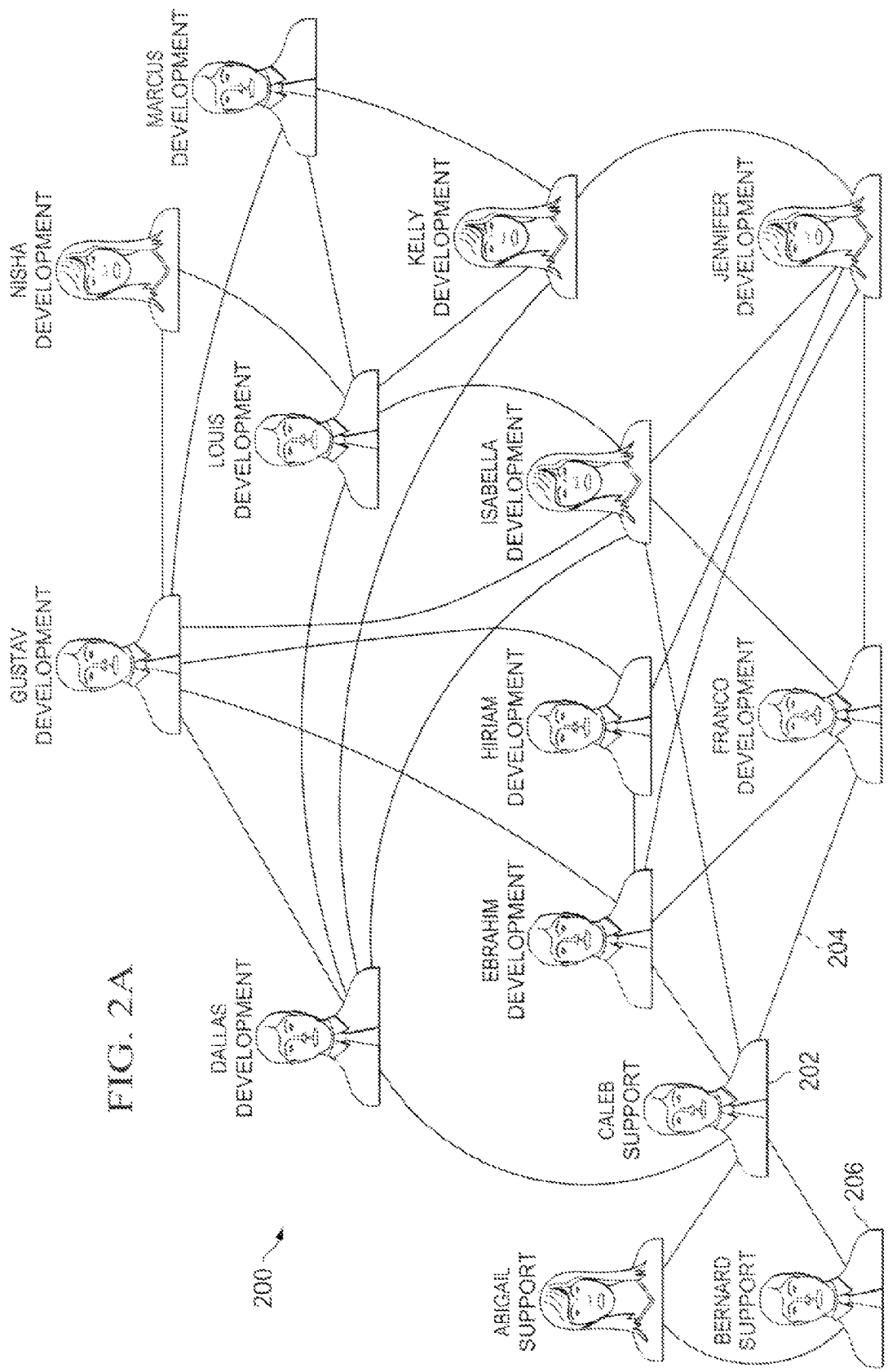

FIG. 2A illustrates one example of a graphical relationship network 200 demonstrating relationship indicators 204 between multiple communication contacts 202, some of which may be connected with a client 206. Graphical relationship network 200 may be developed and rendered utilizing a system for managing communications between a client and server by a relationship network module and interface such as, for example, system 100. Graphical relationship network 200 may be used, for example, to assist an enterprise, and more particularly an employee of the enterprise, in determining which enterprise employee has contacts across multiple divisions within the enterprise. For example, the enterprise may include both Support and Development divisions, among others. A particular employee of the Support division, for example, client 206 (Bernard), may be seeking a contact in the Development division with specialized knowledge. In large enterprises, with multiple divisions spread across multiple countries and continents, traditional methods of finding a single employee with specialized knowledge may be inadequate or time-consuming.

Graphical relationship network 200 may allow client 206 (Bernard) to leverage existing contacts 202 within his own Support division, which may have contacts in the Development division. Client 206 (Bernard) may customize a relationship network module 130 through a relationship network interface 114 to render a graphical relationship network 140 upon request showing all communication contacts 202 with a business or social relationship between the Support and Development divisions. The rendered graphical relationship network 200 indicates that a single Support division employee, i.e., Caleb, has business and/or social relationships with Development division employees, namely, communication contacts Dallas, Ebrahim, Isabella and Franco. Moreover, the rendered graphical relationship network 200 indicates that another Support employee (Abigail) also has a business and/or social relationship with Caleb. Thus, client 206 (Bernard) may leverage the relationships between Caleb and Development employees to determine which Development employee has the sought-after specialized knowledge.

Continuing with FIG. 2A, client 206 (Bernard) may be able to determine which Development employee has the sought-after specialized knowledge with reference exclusively or almost exclusively to graphical relationship network 200. For example, the graphical representation of the communication contacts 202 may include associated data, such as the communication contact 202's specialty, supervisor, or task ownership. The associated data may reside, for example, in an applet, such that the selection of a particular communication contact 202 (e.g., by mouse, keyboard, touchscreen, etc.) may reveal the associated data. In some aspects, the associated data is revealed as fly-over text. Further, in some embodiments, the associated data may be stored locally at the client or on an exchange server. Thus, client 206 (Bernard) may be able to determine which Development communication contact 202 possesses the sought-after specialized knowledge at a glance of graphical relationship network 200.

FIG. 2B illustrates an example graphical relationship network 300 demonstrating relationship indicators 306, 308, 310, and 312 connecting multiple communication contacts 304 and a client 302. Graphical relationship network 300 may be developed and rendered utilizing a system for managing communications between a client and server by a relationship network module and interface such as, for example, system 100. More specifically, graphical relationship network 300 provides a three-dimensional graphical relationship network illustrating various relationships between the client 302 (Isabella) and multiple communication contacts 304.

Graphical relationship network 300 may be utilized by the client 302 (Isabella) as a reference in determining which communication contacts 304 are most commonly and/or frequently contacted and in what circumstances the contacts occur. For example, client 302 (Isabella) may customize various relationship indicators 306, 308, 310, and 312 developed by relationship network module 130 through relationship network interface 114 to indicate various relationship strengths and types. For instance, relationship strength (e.g., frequency of communication) may be indicated through contour width of a relationship indicator. Thus, relationship indicator 306 indicates a stronger relationship between client 302 (Isabella) and communication contact 304 (Caleb) than the relationship between client 302 (Isabella) and communication contact 304 (Jennifer) as shown by relationship indicator 312. Taking this example further, the relationship between client 302 (Isabella) and communication contact 304 (Bernard) may be weaker, as shown by the relatively thin relationship indicator 308, than the client 302's (Isabella) relationship exemplified by relationship indicators 306 and 312.

Continuing with FIG. 2B, as another example, a type of relationship (e.g., business, social, both) may be illustrated by a contour type of the relationship indicator, such as a dashed or solid contour. For instance, client 302 (Isabella) may customize relationship network module 130 such that business relationships are illustrated by solid contour relationship indicators 126 while business/social relationships are illustrated by dashed contour relationship indicators 126. As shown in FIG. 2B, graphical relationship network 300 illustrates that client 302 (Isabella) has business relationships with various communication contacts 304 shown by solid contour relationship indicators 306, 308, and 312, among others. Further, client 302 (Isabella) has a business/social relationship with communication contact 304 (Ebrahim) shown by dashed contour relationship indicator 310.

As a three-dimensional graphical relationship network, graphical relationship network 300 may be manipulated by the client 302 (Isabella) such that various views or perspectives of the network 300 may be presented. For example, client 302 (Isabella) may utilize any appropriate input device (e.g., mouse, keyboard, touchscreen, pointer) to rotate the graphical relationship network 300 within a viewing area, such as, for example, GUI 110. Client 302 (Isabella) may, therefore, view each communication contact in the forefront of the GUI 110 at any particular time. Further, in some aspects, graphical relationship network 300 may be viewed in a stereoscopic display (e.g., a virtual reality simulated environment) and manipulated through a multimodal device, such as wired gloves.

Graphical relationship network 300, like graphical relationship network 200, may include data associated with each communication contact 304. The associated data may reside in an applet such that the selection of a particular communication contact 304 can reveal the associated data (e.g., as fly-over text). As any particular communication contact 304 may continually update data associated with him or her, client 302 (Isabella) may view the most current specialty knowledge, work group, or supervisor (to name but a few examples) of each communication contact 304.

FIG. 2C illustrates an example graphical relationship network 400 including a client 402, a customer communication contact 404, a third party communication contact 406, multiple internal communication contacts 408, and multiple relationship indicators 410, 412, and 414. Graphical relationship network 400 may be developed and rendered utilizing a system for managing communications between a client and server by a relationship network module and interface such as, for example, system 100. Generally, graphical relationship network 400 may allow for the client 402 (Jennifer) as, for example, a CEO of an enterprise, to manage relationships both internal and external to the enterprise. For example, client 402 (Jennifer) may customize relationship network module 130 through relationship network interface 114 to render graphical relationship network 400, which may illustrate a complete enterprise sales team designed to promote products and services to a particular customer communication contact 404 (Surajit). Through customization, client 402 (Jennifer) may view all internal communication contacts 408 (i.e., Caleb, Bernard, Abigail, Franco, and Ebrahim) and any third party communication contacts 406 (David) that are on the sales team. Client 402 (Jennifer) may, therefore, dynamically track the team members and their relationships to each other through the mining of data from team electronic communications by relationship network module 130.

Continuing with FIG. 2C, the client 402 (Jennifer) may also customize relationship indicators 410, 412, and 414 to illustrate, for example, direct communication contact with the customer communication contact 404 (Surajit), internal communications between team members employed by the enterprise, communications from internal team members to external team members (e.g., team members employed by a third party), and a relative frequency of communications between team members. For instance, solid contour relationship indicator 414 may represent communications between internal team members, such as internal communication contacts 408 and client 402 (Jennifer). Dashed relationship indicators 410 and 412 may represent communications between internal team members and external contacts, such as third party communication contact 406 (David) and customer communication contact 404 (Surajit).

Relationship indicators 410 and 412 may also be distinguished by width. For example, communications to the customer communication contact 404 may be represented by a thicker, dashed contour, as compared to communications to the third party communication contact 406. Of course, various characteristics other than contour width may be used to distinguish communications, such as, for example, contour color or contour type. Further, relationship indicators 410, 412, and 414 may also be customized to illustrate a strength of the relationship between contacts (e.g., a frequency or recency of the communications). This relationship characteristic may be illustrated, for example, by the length of the contour between communication contacts.

Regardless of the chosen customization level of the relationship indicators 410, 412, and 414, graphical relationship network 400 may also include associated data with each communication contact 402, 404, 406, and 408. The associated data for a particular communication contact may be displayed when the communication contact is selected (e.g., by mouse, keyboard, touchscreen, etc.). In some implementations, the associated data may be contact information for the communication contact, such as a telephone number, fax number, e-mail address, and mailing address.

FIG. 3 is an example flowchart illustrating a method 500 for the management of communications and generation of a graphical relationship network by a relationship network module, in accordance with certain embodiments included in the present disclosure. In some embodiments, method 500 may be implemented by a system for managing communications between a client and server by a relationship network module, such as, for example, system 100. Method 500 may begin with the relationship network module in a hibernation mode, as shown in step 502. In the hibernation mode, the relationship network module may not actively identify electronic communications and mine communication attributes from the identified communications. For example, a user or client of system 100 may voluntarily choose to set the relationship network module in the hibernation mode for privacy reasons. In step 504, the relationship network module determines if an enable command has been received from, for example, a relationship network interface. If no enable command is received, the relationship network module remains in hibernation mode. However, if an enable command is received, the relationship network module switches to an active mode, illustrated in step 506. In the active mode, the relationship network module may identify electronic communications, as well as receive customization from the client through the relationship network interface, among other actions.

Continuing with method 500, once the relationship network module is in the active mode, the relationship network module identifies an electronic communication in step 508. For example, in some aspects, the relationship network module identifies an e-mail communication that is transmitted from a mail server to a mail client. In particular implementations, the relationship network interface may actively transmit communications (e.g., e-mails, voicemails, text messages, instant messages) to the relationship network module from the client. The identified electronic communication is then parsed into one or more communication attributes, as shown in step 510. The number and type of communication attributes parsed from a particular electronic communication may be customized by the client through the relationship network interface. For example, the client may customize the relationship network module such that the communication date, communication contact, and communication importance are parsed as communication attributes. The parsed communication attributes are stored in an attribute repository in step 512. In step 514, the relationship network module calculates relationship indicators based on the communication attributes. Relationship indicators, for example, may be graphical representations of relationship characteristics exemplified by the communication attributes. For instance, a relationship indicator may be a strength of the relationship between the client and a communication contact, determined by the frequency of electronic communications between the two entities. In some aspects, relationship indicators may be linear or substantially linear contours with varying characteristics (e.g., color, width, length, type) to indicate relationship strength and type.

Continuing with method 500, in step 516, the relationship network module may receive a request for a graphical relationship network. If no request is received, the relationship network module continues to identify electronic communications in step 508. If a request is received from, for example, the relationship network interface, then the relationship network module presents the graphical relationship network to the relationship network interface for viewing by the client, as shown in step 518. In step 520, if the relationship network module receives a disable command, it enters the hibernation mode. If no disable command is received, however, the relationship network module continues to operate in the active mode in step 506.

FIG. 4 is an example flowchart illustrating a method 600 for the management of communications and customization of a relationship network module through a relationship network interface, in accordance with certain embodiments included in the present disclosure. In some embodiments, method 600 may be implemented by a system for managing communications between a client and server by a relationship network module, such as, for example, system 100. In step 602, a user or client enables the relationship network module through the relationship network interface. Turning briefly to FIG. 5, this figure shows an example GUI 700 that may be used by the user or client to enable or disable the relationship network module. As shown in FIG. 5, the user may select an option to Enable Relationship Network Module, thus bringing the relationship network module into the active mode, as discussed above. By deselecting this option, the user may cause the relationship network module to enter the hibernation mode.

Returning to FIG. 4, the relationship network module monitors electronic communications, often as they occur. In some implementations, the relationship network interface passively monitors the communication (e.g., e-mail, voicemail, text message, instant message) from, for example, the client to a communication server. In other cases, the relationship network module may actively transmit the electronic communication from the client to the relationship network module. In step 606, if no request is received from the user for a graphical relationship network through the relationship network interface, the interface continues to monitor additional electronic communications. If a request for the graphical relationship network is made, the relationship network interface transmits the request to the relationship network module, as shown in step 608. The interface receives the graphical relationship network in step 610 and presents it to the user or client in step 612.

Continuing with method 600, the user may choose to initiate a customization interface in step 614. Turning briefly to FIG. 5, this figure also provides one example of a GUI 700 that may allow the user to customize the relationship network module. For example, GUI 700 may allow the user to choose which communication contacts' communications should be identified by the relationship network module. Further, GUI 700 may allow the user to choose which communication attributes to mine from the electronic communications. The user may also, through GUI 700, customize and edit relationship indicators. For example, in some aspects, the relationship indicators may be contours of differing color, width or type. These contour characteristics may be customized and edited through GUI 700 by, for instance, changing contour color to represent various levels of communication importance.

Returning to FIG. 4, if the user does not initiate the customization interface, the relationship network interface continues to monitor electronic communications in step 604. If the user initiates the customization interface, the relationship network interface presents the customization interface to the user in step 616. Next, a user customization (e.g., customization of communication contacts, communication attributes, or relationship indicators) is received by the relationship network interface through the customization interface, as shown in step 618. In step 620, the user customization is transmitted to the relationship network module by, for example, the relationship network interface. In return, as shown in step 622, the relationship network interface receives a modified graphical network relationship from the relationship network module, which encompasses the changes made by the user customization, if any. In step 624, the user may choose to disable the relationship network module through, for example, GUI 700. If the user disables the relationship network module, it enters the hibernation mode, as shown in step 626. In some aspects, if the relationship network module is in the hibernation mode, the relationship network interface does not monitor or transmit any electronic communications. If the user chooses not to disable the relationship network module, it remains in the active mode and the relationship network interface continues to monitor or transmit electronic communications to the relationship network module.

The preceding flowcharts and accompanying description illustrate example methods. Relationship network module 130 contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, relationship network module 130 and relationship network interface 114 may implement techniques with additional steps, fewer steps, and/or different steps, so long as the methods remain appropriate. For example, in certain cases, the relationship monitoring may be "always on," which means there may be no enablement as shown in step 504. In another example, certain users may not have the security ability to customize some or all of the options. In short, although this disclosure has been described in terms of certain embodiments and generally associated methods and processes, alterations and permutations of these embodiments and methods will be apparent to those skilled in the art. Accordingly, the above description of example embodiments does not define or constrain the disclosure. Other changes, substitutions, and alterations are also possible without departing from the spirit and scope of this disclosure, and such changes, substitutions, and alterations may be included within the scope of the claims included herewith.

What is claimed is:

1. A computer program product tangibly embodied on a non-transient computer readable medium for managing user relationships, the computer program product storing instructions operable when executed by a hardware processor to:
    identify an electronic communication;
    parse the electronic communication into a first communication attribute and a second communication attribute;
    store the first and second communication attributes in an attribute repository;

calculate one or more relationship indicators based on at least a subset of the attribute repository including at least one of the first and second communication attributes; and in response to a request, communicate at least a subset of the relationship indicators to an interface for presentation as a graphical relationship network.

2. The computer program product of claim 1, wherein the instructions comprise a client agent and further operable to enter an active mode based on an activation command.

3. The computer program product of claim 1, the graphical relationship network comprising:
   at least one communication contact; and
   the subset of relationship indicators, each relationship indicator comprising a first characteristic and a second characteristic, the first characteristic indicating a relationship strength and the second characteristic indicating a relationship type.

4. The computer program product of claim 3, the relationship indicator comprising a substantially linear contour.

5. The computer program product of claim 4, the first characteristic indicating the relationship strength through a contour length, the second characteristic indicating the type of relationship through at least one of:
   a contour color;
   a contour width; and
   a contour type.

6. The computer program product of claim 3, the first communication attribute comprising the communication contact and the second communication attribute comprising at least one of:
   a date of the electronic communication;
   a subject of the electronic communication; and
   a content attribute of the electronic communication.

7. The computer program product of claim 6, the content attribute of the communication comprising at least one of:
   a security indication;
   an importance indication;
   a confidential indication;
   a business attribute; and
   a contact relationship.

8. The computer program product of claim 6, wherein the instructions are further operable to calculate the relationship strength based at least in part on one or more of the following:
   frequency of the communication contact; and
   a recency of the communication contact.

9. The computer program product of claim 1, wherein the instructions are further operable to:
   receive a user customization comprising a communication attribute selection;
   modify the graphical relationship network based on the user customization;
   receive a disable command; and
   enter a hibernation mode based on the disable command.

10. The computer program product of claim 1, the graphical relationship network comprising a three-dimensional graphical relationship network.

11. The computer program product of claim 1, the attribute repository comprising communication attributes keyed by a user.

12. The computer program product of claim 1, the electronic communication comprising one of:
   an electronic mail communication;
   a voicemail communication;
   an electronically logged physical communication;
   a text message communication; and
   an instant message communication.

13. A system for managing user relationships, comprising:
   at least one memory, the memory storing:
      at least one electronic communication; and
      a relationship network module; and
   one or more processors adapted to execute the relationship network module such that the relationship network module is operable to:
      identify the electronic communication;
      parse the electronic communication into a first communication attribute and a second communication attribute;
      store the first and second communication attributes in an attribute repository;
      calculate one or more relationship indicators based on at least a subset of the attribute repository including at least one of the first and second communication attributes; and
      in response to a request, communicate at least a subset of the relationship indicators to an interface for presentation as a graphical relationship network.

14. The system of claim 13, the graphical relationship network comprising:
   at least one communication contact; and
   the subset of relationship indicators, each relationship indicator comprising a first characteristic and a second characteristic, the first characteristic indicating a relationship strength and the second characteristic indicating a relationship type.

15. The system of claim 14, the first communication attribute comprising the communication contact and the second communication attribute comprising at least one of:
   a date of the electronic communication;
   a subject of the electronic communication; and
   a content attribute of the electronic communication.

16. The system of claim 14, the relationship indicator comprising a substantially linear contour.

17. The system of claim 16, the first characteristic indicating the relationship strength through a contour length, the second characteristic indicating the type of relationship through at least one of:
   a contour color;
   a contour width; and
   a contour type.

18. The system of claim 17, the relationship network module further operable to calculate the relationship strength based at least in part on one or more of the following:
   frequency of the communication contact; and
   a recency of the communication contact.

19. The system of claim 13, the relationship network module further operable to:
   receive a user customization comprising a communication attribute selection;
   modify the graphical relationship network based on the user customization;
   receive a disable command; and
   enter a hibernation mode based on the disable command.

20. The system of claim 13, the electronic communication comprising one of:
   an electronic mail communication;
   a voicemail communication;
   a text message communication; and
   an instant message communication.

21. A computer program product tangibly embodied on a non-transitory computer readable medium for managing user relationships, the computer program product storing instructions operable when executed by a hardware processor to:

monitor an electronic communication sent from a communication system for communication to a relationship network module, the relationship network module operable when executed to:
  identify the electronic communication;
  parse the electronic communication into a first communication attribute and a second communication attribute;
  store the first and second communication attributes in an attribute repository; and
  calculate one or more relationship indicators based on at least a subset of the attribute repository including at least one of the first and second communication attributes;
request a graphical relationship network from the relationship network module;
receive the graphical relationship network in response to the request, the graphical relationship network comprising:
  at least one communication contact; and
  at least a subset of the relationship indicators; and
present the graphical relationship network to a user through a graphical user interface.

22. The computer program product of claim 21, wherein the instructions are further operable to:
present a user customization interface to the user;
receive a user customization from the user; and
send the user customization to the relationship network module.

23. The computer program product of claim 21, wherein the instructions are further operable to receive the electronic communication from the communication system and transmit the electronic communication to the relationship network module.

24. The computer program product of claim 21, wherein the instructions comprise a communication system plug-in.

* * * * *